United States Patent
Hale

(10) Patent No.: US 6,249,638 B1
(45) Date of Patent: Jun. 19, 2001

(54) PHOTOCURABLE LOW REFRACTIVE INDEX COATINGS

(75) Inventor: Arturo Hale, New York, NY (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/079,070

(22) Filed: May 14, 1998

Related U.S. Application Data

(62) Division of application No. 08/774,563, filed on Dec. 31, 1996, now Pat. No. 5,756,209.

(51) Int. Cl.[7] .................................. G02B 6/00; H01S 3/06
(52) U.S. Cl. ........................... 385/145; 385/144; 385/126; 372/6; 359/341
(58) Field of Search ..................................... 385/143–145, 385/141, 123, 126; 372/6; 359/341, 343

(56) References Cited

U.S. PATENT DOCUMENTS

| 4,511,209 | 4/1985 | Skutnik . | |
|---|---|---|---|
| 5,024,507 | 6/1991 | Minns et al. . | |
| 5,484,822 | 1/1996 | Minns | 522/35 |
| 5,873,923 | * 2/1999 | DiGiovanni | 65/390 |

FOREIGN PATENT DOCUMENTS

| 0 128 516 | 12/1984 | (EP) . |
| 0 454 845 | 11/1991 | (EP) . |
| 0 457 903 | 11/1991 | (EP) . |
| 0 521 360 | 1/1993 | (EP) . |
| 0 776 074 | 5/1997 | (EP) . |
| 5-247142 | 9/1993 | (JP) . |
| 6-040748 | 2/1994 | (JP) . |
| WO 93/04132 | 3/1993 | (WO) . |
| WO 96/03609 | 2/1996 | (WO) . |

\* cited by examiner

*Primary Examiner*—Hemang Sanghavi

(57) ABSTRACT

A clad optical fiber comprising a core of glass, optionally a glass cladding with a lower refractive index than the glass core and a polymeric cladding made of a material having a refractive index smaller than that of the core (and smaller than that of the glass cladding, if any). The polymeric cladding is made of a cured material of a viscosity increased di- or multi-functional (meth)acrylate and a photopolymerization initiator.

17 Claims, 2 Drawing Sheets

PHOTOCURABLE LOW REFRACTIVE INDEX COATINGS

This is a divisional of application Ser. No. 08/774,563 filed Dec. 31, 1996 now U.S. Pat. No. 5,756,209.

FIELD OF THE INVENTION

The present invention relates to curable materials which are derived from di- or multifunctional(meth)acrylates. Di- or multifunctional(meth)acrylates are reacted with multifunctional materials so as to partially crosslink the di- or multifunctional (meth)acrylate and provide a viscosity increased material which can be cured or subsequently polymerized to a final product.

BACKGROUND OF THE INVENTION

Although most optical fibers consist of doped or undoped glass core surrounded by a doped or undoped glass cladding, there are several cases in which it may be advantageous to use a polymeric material as cladding instead of siliceous glass. Polymeric materials are flexible, so they do not break as easily when the fiber is bent. Besides, the refractive index of polymers can be made lower than that achievable by doping silica with fluorine or boron. This lower refractive index provides a larger numerical aperture, thereby increasing the acceptance angle for the incoming radiation. U.S. Pat. No. 4,511,209 and European Pat. No. 0 333 464 B1 disclose polymer compositions suitable for use as claddings for optical fibers.

Other devices that require low refractive index coatings are optical fiber lasers and amplifiers (cladding pumped lasers) such as those described in co-assigned U.S. patent application Ser. No. 08/561,682 and in U.S. Pat. No. 4,815,079. These devices comprise a doped glass core, a doped or undoped glass cladding and an outer polymer cladding. The core is pumped by a laser guided through the inner (glass) cladding; the outer (polymer) cladding has an even lower refractive index so that the combination inner/outer cladding can act as a waveguide. The numerical aperture and, therefore, the output power of this device is a function of the difference in the refractive indices between the inner and outer claddings. In this sense, it is desirable to have a polymer cladding with the lowest possible refractive index.

The process currently used to coat glass fibers with polymers comprises applying a UV-curable formulation with a die. Acrylate-functional formulations are the most widely used coating materials because of their extremely fast curing rates, ease of synthesis and commercial availability. Commercially available low-refractive index polymer coating formulations have indices on the order of 1.38–1.42 (for example "OPTI->CLAD" supplied by Optical Polymer Research, Inc., Gainesville, Fla.). The patent literature shows coatings with refractive indices in the range 1.37–1.43 (U.S. Pat. No. 4,508,916, U.S. Pat. No. 4,511,209, U.S. Pat. No. 4,971,424, U.S. Pat. No. 5,024,507, and U.S. Pat. No. 5,239,026). There are some newer materials that have much lower refractive indices (1.31–1.33). Nevertheless, there is no practical process currently available to coat these materials onto a glass fiber because their viscosities are too low for a standard die-coating application. Additionally, these materials are highly fluorinated and commercially available photoinitiators (required for a UV-curing formulation) are typically not soluble in the lowest refractive index materials.

One means for circumventing these problems is disclosed in European published patent application 0 521 360 A2. However, the approach of the reference is quite complicated.

B-staging is a procedure commonly used with epoxy resins to advance the reaction to limited extent. For instance, in laminated composites, a liquid epoxy resin is first "B-staged" to a tacky sheet that can then be stacked with other sheets and further cured. However, it is not believed that such B-staging has been utilized in the case of acrylates or methacrylates in order to intentionally raise their viscosity significantly.

It is an object of the present invention to provide a new group of materials which are prereacted and which maintain the (meth)acrylate functionality so that they be cured to a final product.

It is a further object of the present invention to provide new (meth)acrylate-containing materials having an increased viscosity or which are materials ranging from soft gels to solids wherein such materials can be cured to a hard product.

It is a still further object to provide a cladding-pumped laser having an improved outer polymer cladding.

Yet another object of the present invention is to provide ultra-low refractive index photo-curable coatings.

It is a further object to provide plastic-clad optical fibers, wherein the cladding material is the free-radical polymerization product of the aforementioned coating material.

SUMMARY OF THE INVENTION

The present invention comprises the reaction of di- or multi-(meth)acrylates with at least one multifunctional crosslinking reactant which can react with the di- or multi-(meth)acrylate functionality in a stepwise manner. By reacting a di- or multi-(meth)acrylate with an amount of the at least one multifunctional crosslinker via a stepwise reaction, a branched structure material including (meth)acrylate groups is formed wherein curing can then be achieved via the (meth)acrylate groups.

Alternately, the branched structure can be obtained by reacting a multifunctional(meth)acrylate with a difunctional (or multifunctional) crosslinker.

In this application, "multifunctional" refers to a molecule whose functionality (i.e. number of reactive groups) is greater than two.

DETAILED DESCRIPTION OF THE INVENTION

The present invention more specifically relates to a method for increasing the viscosity of di- or multi-(meth) acrylates. In one embodiment, the instant invention relates to increasing the viscosity of fluorinated oligomers so that these materials are suitable for die coating applications. Fluorosubstituted diacrylates are useful starting materials in the present invention and typical such fluorinated diacrylates are disclosed in European Patent Application 0 521 360 A2. The disclosure of this published patent application and all other patents and reference mentioned herein are specifically incorporated by reference into the present application.

The fluorosubstituted diacrylates useful in the present invention preferably contain at least about 25 percent and more preferably from about 25 to about 65 percent by weight of fluorine. An example of fluorosubstituted di- or multi-(meth)acrylates which are suitable for the preparation of ultra-low refractive index coatings are di- or multi-(meth)acrylates of the formula:

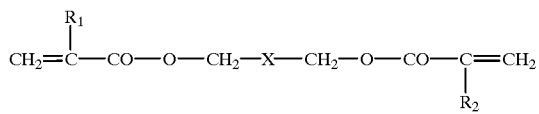

in which $R_1$ and $R_2$ each independently represent H or $CH_3$ and X is a perfluorinated grouping, or a perfluoroalkylene grouping in which one or more carbon atoms have been replaced by oxygen (—O—) linkages. Examples of such diacrylates include, for instance,

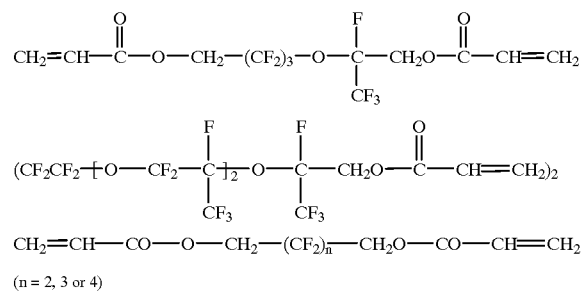

(n = 2, 3 or 4)

A specific preferred diacrylate for use in the present process is that of the formula:

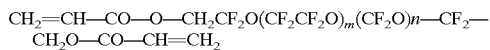

(wherein m/n is in the range of 0.2:1 to 5:1), which is sold by Minnesota Mining and Manufacturing Company under the tradename L-9367.

L-9367 has a molecular weight of about 2000 but its viscosity is only 35 cP which is orders of magnitude lower than an equivalent hydrocarbon diacrylate. Die coating applications generally require a formulation with a viscosity of between about 1000 and about 15000 cP.

In the present invention a multifunctional crosslinker that can react with the meth(acrylate) functionality in a step-wise fashion is employed to form an intermediate of greater viscosity than the starting material and which will subsequently be reacted by various means to a final product. One means for controlling the reaction and attaining a desired viscosity is by reacting a di- or multi-(meth)acrylate with a particular amount of multifunctional crosslinker via a stepwise reaction so as to form a branched structure. The molecular weight of the branched structure material depends on the ratio of crosslinker to di- or multi-(meth)acrylate. As the ratio of crosslinker to di- or multi-(meth)acrylate is increased, the molecular weight and, therefore, the viscosity of the branched structure material increases. This increase is very gradual for low crosslinker/di- or multi-(meth)acrylate ratios. However, the increase becomes very steep and eventually diverges at a particular ratio. After the particular ratio, gelation occurs. The particular ratio for any particular crosslinker and di- or multi-(meth)acrylate depends on the nature and functionality of the crosslinker and the nature of the di- or multi-(meth)acrylate. This ratio can be predicted from theory and it is easily determined by routine experimentation. For a tetrafunctional crosslinker and a di(meth)acrylate, the molar ratio is about 1/6. The weight-average molecular weight as a function of crosslinker/diacrylate ratio can be calculated as outlined by Macosko and Miller, Macromolecules, 9, 199 (1976).

Hence, in general, the viscosity of the product can be controlled by limiting the amount of crosslinker. A significant viscosity increase can only be achieved if the amount of crosslinker is close to the critical gelation ratio. Nevertheless, in order to prevent gelation, the amount of crosslinker used should be lower than the critical gelation ratio.

Controlling the viscosity by limiting the amount of crosslinker may, in some instances, be difficult because the weight of crosslinker must be weighed very accurately. Three alternative ways of controlling viscosity have been found i.e.:

a) by inhibiting the catalyst;
b) by end-capping the crosslinker; and
c) by cooling or freezing or refrigerating the product.

As an example, a platinum-catalyzed hydrosilylation reaction with di- or multi-(meth)acrylate can be inhibited with any of a variety of inhibitors. A list of some exemplary inhibitors is as follows:
benzylalcohol,
1-ethynyl-1-cyclohexanol,
tetramethylethylenediamine,
2-methyl-3-butyn-2-ol,
3,5-dimethyl-1-hexyn-3-ol,
2-tertbutylhydroperoxide,
benzotriazole,
diethylmaleate,
triphenylphosphine,
1,1-azobis(dimethylformamide),
dimethyl maleate,
4-phenyl-1,2,4-triazoline-3,5-dione,
4-methyl-1,2,4-triazoline-3,5-dione, and
2-phenyl-3-butyn-2-ol.

These inhibitors are used in small concentrations, i.e., in amounts effective to controllably inhibit the catalysis of the reaction of the di- or multi-(meth) acrylate and the crosslinker, typically less than 1% by wt. Chelating agents such as acetylacetonate, trifluoroacetylacetonate and tetramethyl ethylenediamine can also be used to stop the crosslinking reaction.

The viscosity can be controlled by allowing the crosslinking reaction to proceed until the desired viscosity is achieved, at which point an inhibitor is added to stop the reaction. It was found that although small amounts of inhibitors do prevent gelation in the short term, gelation can still occur within a few days.

A different approach that proved to be more effective was to add a large amount of inhibitor (i.e. 100 g inhibitor per 100 g reacting mixture), shake it well, and let the fluorinated mixture settle for a few days.

Gelation during the crosslinking reaction can also be prevented by capping the crosslinker with a monofunctional reagent. Thus, when the viscosity rises to the desired value, a large amount of a monofunctional molecule that can react with the functional group of the crosslinker is added. This molecule should react quickly with for example the Si—H bond (in the case of a hydrosilylation crosslinking reaction); vinyl or allyl functionalities, for example, are suitable for this reaction. Two important issues are that a large excess of this vinyl or allyl molecule to react with the Si—H bond should be added to ensure endcapping will be favored over crosslinking, and that the molecule has to be miscible with the (meth) acrylate formulation.

A third way to prevent gelation during the stepwise crosslinking process is to choose reaction conditions such that the crosslinking is very slow at room temperature (i.e. gelation time on the order of days). This can be done, for instance, by manipulating the catalyst concentration. The crosslinking reaction then is carried out at an elevated temperature until the desired viscosity is achieved, at which point the product is stored in a refrigerator or freezer until it is needed.

Various materials can be used in the instant invention as crosslinkers to increase the viscosity of di- or multi-(meth) acrylates. In effect, any multifunctional material capable of reacting in a step-wise manner with di- or multi-(meth) acrylates can be employed. The term "step-wise" is emphasized here as opposed to the chain mechanism typically associated with free-radical(meth)acrylate polymerization. The step mechanism is desired here because the molecular weight build-up is gradual, thus making it possible to control the viscosity and to avoid gelation. On the other hand, a chain mechanism produces large molecules very early in the reaction, and gelation of the di- or multi-(meth)acrylate occurs at very low extents of reaction, thus making it very difficult to control viscosity before gelation occurs. Two examples of such step-wise reactions are hydrosilylation reactions and Michael addition reactions. Hydrosilylation reactions encompass the addition of a silane to the vinyl moiety of the di- or multi-(meth)acrylate as follows:

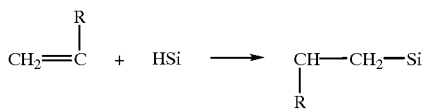

Michael-type addition of monofunctional nucleophiles onto monofunctional double bonds activated by electron withdrawing groups are known, as are reactions of bifunctional nucleophiles with diolefins (F. Danusso, P. Ferruti, Polymer 11, 88 (1970). The base-catalyzed Michael-type addition of dithiols onto activated di- or multi-(meth) acrylates is disclosed in Makromol. Chem. 191 2465–2473 (1990). In the present invention a Michael adduct of the di- or multi-(meth)acrylate with a multifunctional monomer containing primary or secondary amino groups or mercapto groups can be employed.

The Michael adduct is prepared by reacting the multifunctional material with the di- or multi-(meth)acrylate under conditions sufficient to form the adduct. By such conditions is meant that the di- or multi-(meth)acrylates are sufficiently active to undergo Michael addition with the multifunctional material. If desired, the reaction can be optionally catalyzed by addition of an organic base or inorganic base. In general, the reaction is carried out by adding the multifunctional material to stirred mixture containing the di- or multi-(meth)acrylate and, if desired, a suitable solvent to reduce viscosity. The reaction temperature can be initially ambient temperature or slightly above ambient temperature. Cooling may or may not be necessary depending upon the exothermic nature of the particular reaction and the scale on which it is conducted. Following addition of the multifunctional material, the reaction can be carried out to completion by optionally heating at a temperature ranging from about 50° C. to about 80° C. for a period of from about 1 to about 15 hours. The extent of the completion of the reaction can be controlled and monitored using routine techniques well known to those skilled in the art.

The hydrosilylation reaction is conducted in a manner such that β-addition is significant. Hydrosilylation can proceed in three different ways, α-addition, β-addition or a 1,4-addition. The relative importance of each reaction depends on the particular reagents used, the reaction temperature and the catalyst: J. L. Speier, J. A. Webster, G. H. Barnes, J. Am. Chem. Soc. 79, 974–979 (1957), L. Goodman, R. M. Silverstein, A. Benitez, J.Am. Chem. Soc., 79, 3073–3077 (1957), I. Ojima, M. Kumagai, and Y. Nagai, J. Organomet. Chem., 111, 43–60 (1976), R. Skoda-Foldes, L. Kollar, and B. Heil, J. Organomet. Chem., 408, 297–304 (1991), K. D. Belfield, X. Z. Lin, I. Cabasso, J. Polym. Sci: Part A: Polym. Chem., 29, 1073–1076 (1991), P. Boudjouk, S. Kloos, A. B. Rakjumar, J. Organomet. Chem., 443, C41–C43 (1993). Although all three reactions can provide an increased viscosity di- or multi-(meth)acrylate product, the β-addition is the preferred route since it yields the most stable product.

As long as the β-addition is significant, the presence of other reactions is not a problem since the hydrosilylated product will be subsequently cross-linked by (meth)acrylate polymerization.

In general, it is known that β-addition is favored at high temperatures. The structure of the silane and di- or multi-(meth)acrylate also influence the reaction product with β-addition being generally favored when bulky groups are present on the reactants. Methacrylates have been found to favor β-addition with platinum catalysts.

Platinum and rhodium catalysts of the hydrosilylation reaction are generally not regioselective. Hydrosilylation of α,β-unsaturated esters when catalyzed by tris (triphenylphosphine) chlororhodium afford 1,2-adducts or 1,4-adducts selectively in high yield.

Other catalysts useful in the present hydrosilylation reaction are binary catalyst systems composed of a copper or a copper compound or salt and tetramethylene-diamine (TMEDA). Such catalyst systems have been reported in Journal of Organometallic Chemistry, 443 C41–C43 (1993). Copper, copper (I) and copper (II) compounds can be employed. In a typical reaction, the catalyst system can comprise $Cu_2O$ and TMEDA. Various tertiary amines including, for example, trialkylamines such as triethylamine might also be used. Typical copper compounds include, for example, CuCl, CuBr, $CuCl_2$, $CuBr_2$, CuCN, $2CuO*Cr_2O_3$, and $CuSO_4$.

Hydrosilylation catalysts useful in the present invention are generally selected from transition metals of Group VIII in the Periodic Table and their compounds. Exemplary Group VIII metal compounds are compounds and/or complexes of platinum, palladium, rhodium, ruthenium, and iridium. Some examples include Pt—C, chloroplatinic acid, $(Ph_3P)_3RhCl_2$, $PtCl_4$, Pt-ether complexes, Pt-olefin complexes, $PdCl_2(PPh_3)_2$, $PdCl_2(PhCN)_2$.

The present invention encompasses the controlled and/or stepwise crosslinking of a diacrylate so as to form an increased viscosity material. Such crosslinking can be accomplished by the use of multifunctional materials which can react with the carbon-carbon unsaturations of the diacrylate. Typical such multi-functional reactants include tri- or tetra-silanes or tri- or tetra functional compounds containing groups which can take part in a Michael addition reaction with the diacrylate.

Silane crosslinkers react via a hydrosilylation reaction and include any molecule containing multiple reactive silane (Si—H) groups. Normally, silane crosslinkers would be tri- or tetra functional. However, polymeric or oligomeric silanes can be used in which the polymer or oligomer has a varied number of repeating silane units but wherein the overall functionality of the oligomeric or polymeric silane material is greater than two.

Some general formulae for typical multisilane crosslinkers include the following:

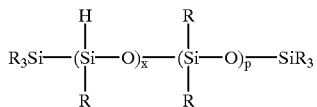

wherein each R independently is a straight chain or branched aliphatic or aromatic hydrocarbon or fluorocarbon moiety such as a $C_1$–$C_6$-alkyl or perfluoroalkyl and wherein x is greater than 2; $p \geq 0$

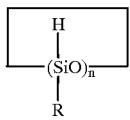

in which n is greater than or equal to 3 and R is as defined hereinabove;

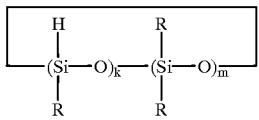

in which k is greater than 2 and m is equal to or greater than 0 and R is as defined hereinabove;

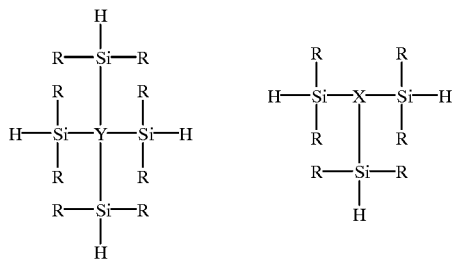

in which R in each structure is as defined hereinabove and X and Y are also non-reactive groups to which silane moieties are covalently bonded. The nature of the X and Y moieties is not critical and any non-reactive group which does not interfere with the silane crosslinking reaction can be employed. Such groups and compounds are well-known to those skilled in this art area. $RSiH_3$ where R can be alkyl, aryl, etc. Specific examples: phenyl silane, hexyl silane, etc. Some non-limiting examples of useful silanes include:

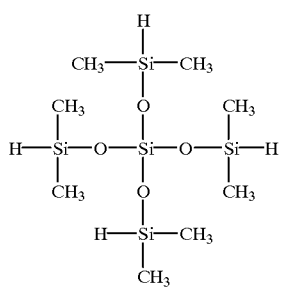

tetrakis (dimethylsiloxy) silane;

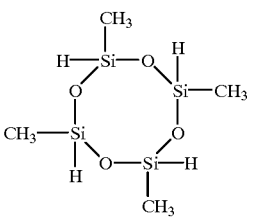

tetramethyl cyclo tetrasiloxane; and

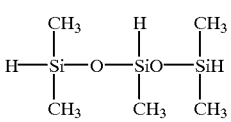

Amines can also be used to crosslink the diacrylates and to form increased viscosity materials. It should be noted that either primary or secondary amines can be used. A primary amine, i.e., $NH_2$, contains two reactive H's and hence is a difunctional reactant. In this sense, a diamine of the general formula:

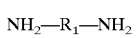

in which $R_1$ is any non-reactive moiety to which the amine groups can be covalently attached can be employed as a tetrafunctional crosslinking reactant. In general diamines, triamines and tetraamines of the following general formulae can be employed:

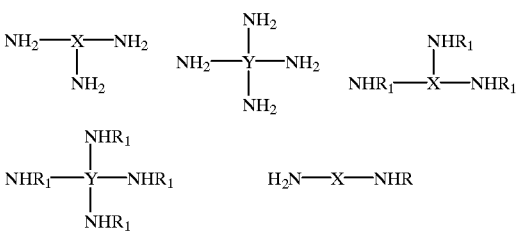

in which X, Y and R are as defined above in the silane formulae and $R^1$ can be the same as R or can also be an aryl, alkaryl or aralkyl.

Mercaptans having the following general formulae can be employed:

in which X and Y are as defined hereinabove. An example of a useful tetramercaptan is the following:

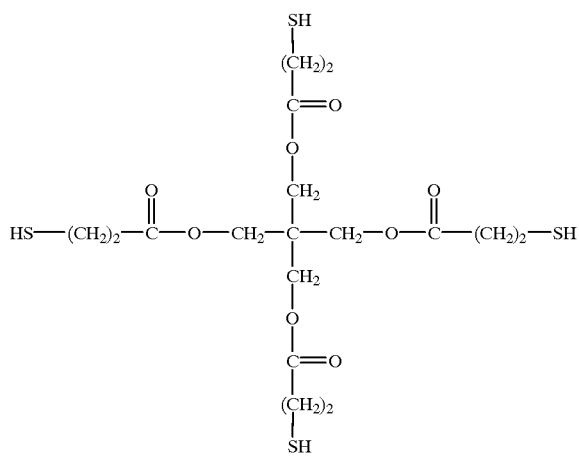

As noted above, the controlled or stepwise diacrylate crosslinking employed in the present invention can also be accomplished via reaction with a multi-functional reactant capable of taking part in a Michael addition reaction. Typical such Michael addition reactants besides amines and mercaptans are compounds containing active methylene groups such as are present in for example malonic acid esters. Hence a compound of the general formula:

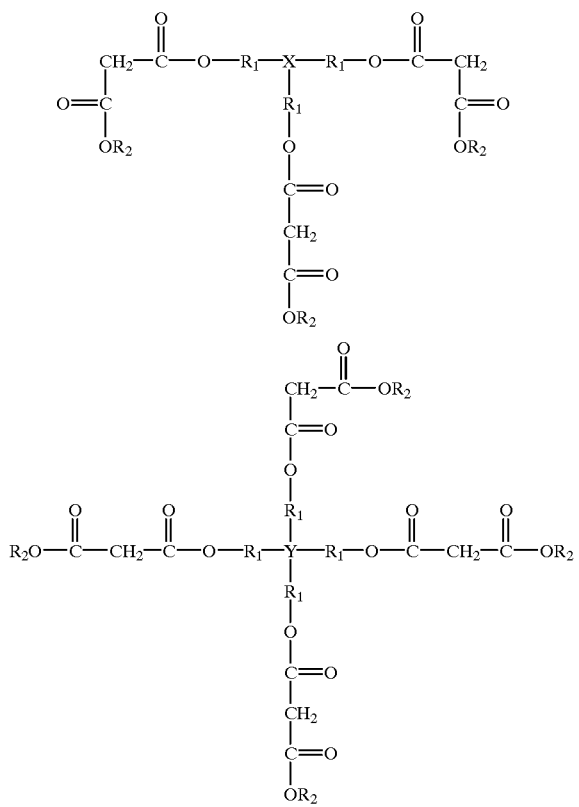

in which X and Y are as defined hereinabove and $R_1$ is a direct bond or a non-reactive linking group between the X and Y and the malonate moieties. In effect, any compound containing three or four active methylene groups can be employed. The malonates shown above are illustrative only and are not limiting on the type of material which can be used in the present invention. An example of a non-malonate Michael addition reactant might include:

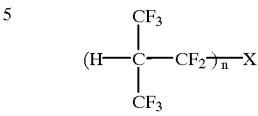

in which X is as defined above and n is equal to or greater than 3.

Michael addition crosslinking can be catalyzed if desired by use of base catalysis such as alkali metal or alkaline earth metal hydroxides or alkoxides or organic bases.

The increased viscosity materials of the instant invention are useful as a cladding material for optical fibers. It has found that the viscosity modified di- or multi(meth)acrylates described herein provide very low refractive index cladding which can be coated on optical fibers and cured with a photoinitiator. Hence, the present invention comprises a process of cladding an optical fiber which process comprises coating the optical fiber with a layer of the present viscosity modified di- or multi(meth)acrylates and a photoinitiator and exposing the coated optical fiber to radiation such as ultraviolet light thereby curing the layer to produce a cladding on the optical fiber. If desired, means other the ultraviolet light capable of curing the curable layer on the optical fiber can be employed. For example, if electron-beam radiation is used, the formulation can be cured without using a photoinitiator. Such curing means is well within the skill of the ordinary artisan.

It has also been found that a curable composition which forms a layer on the optical fiber can be provided such that incompatibility and haze problems which may occur because of the nature of the photoinitiator or the viscosity modified di- or multi(meth)acrylate can be alleviated by the use of at least one fluorinated compatibilizer in the viscosity modified diacrylate/photo-initiator admixture. It is desirable that the fluorinated compatibilizer have a UV-reactive functionality such as a (meth)acrylate so it can get covalently bonded to the UV-cured network. Typical fluorinated compatibilizers which are useful for this purpose are fluorinated (meth) acrylates that also have polar groups. Fluoroacrylates with sulfonamide groups are particularly desirable. These acrylates can be represented by the following formula:

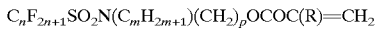

$$C_nF_{2n+1}SO_2N(C_mH_{2m+1})(CH_2)_pOCOC(R)=CH_2$$

where n, m, p≧1; R is H or $CH_3$.

Specific examples include the above formula where n=8, m=2, and R is a hydrogen. This material is commercially available from 3M as FX-13. The corresponding methacrylate (R is $CH_3$) is available as FX-14. Another (preferred) example consists of the above formula where n=8, m=4, and R is a hydrogen. This acrylate is available from 3M as FX-189.

The present invention further encompasses an optical fiber having a cured layer of the present low refractive index viscosity modified diacrylates.

Photoinitiators useful to cure the layer on the optical fiber include any compound which easily generates a free radical through UV light irradiation or an equivalent means. Such compounds include, for example, benzophenone, acetophenone, benzil, benzoin, benzoin methyl ether, benzoin isobutyl ether, benzyl dimethyl ketal, α,α'-azobisisobutyronitrile, benzoyl peroxide, 1-hydroxycyclohexyl phenyl ketone, 2,2-dimethoxy-2-phenylacetophone, 2-hydroxy-2-methyl-1-phenyl-propan-1-one (DAROCUR 1173) and 2,2-diethoxyacetophenone (DEAP). The amount of photoinitiator is easily determined by the skilled artisan and as an example the amount added is usually between about 0.1 and about 10%.

Curing can be effected by use of any commercially available UV lamps of adequate power, for example xenon radiant lamps and Hg-vapor lamps. Pulsed radiant lamps and also UV lamps which have no electrodes and with which excitation is effected by microwaves are also suitable.

The coating composition for the optical fiber according to the present invention may optionally contain a coupling agent (also known as adhesion promoter) for improving the adhesion between the polymer coating and the glass substrate. Coupling agents are molecules with dual functionality. One part of the molecule can react with the silica surface, while the other part can react with the polymerizing formulation. Such coupling agents are well known in the art (see for example E. P. Plueddemann, "Silane Coupling Agents," Plenum. 1982).

An improvement over commercially available silane coupling agents is disclosed in the U.S. patent application entitled Curable Coatings with Improved Adhesion to Glass having the Ser. No. 08/774,562 filed concurrently herewith. The disclosure of this application is incorporated by reference herein. This improvement consists of attaching the coupling agent molecule directly to a relatively long diacrylate molecule that is part of the coating formulation. In the instant invention this can be achieved for example by reacting trimethoxysilane with the diacrylate L-9367 via hydrosilylation using a large excess of acrylate groups. This can be done sequentially or at the same time as the viscosity-building hydrosilylation crosslinking described above. The resulting product contains some relatively long molecules that have an alkoxysilane functionality on one end; after UV-curing this silane-functional end is free to interact with the silica glass substrate, therefore linking the polymer network to the glass substrate.

The coating composition for the present invention may optionally contain other mono, di or multifunctional (meth) acrylates, which may or may not be fluorinated, in order to optimize the processing and mechanical properties of the coatings. For instance, monofunctional acrylates can be used to add flexibility to the cured coating, while di or multifunctional acrylates can be used to increase it stiffness. Likewise, small amounts of antioxidants and stabilizers may be added to improve the long-term performance. These additives are well known in the art.

The present invention will be illustrated by the following non-limiting examples. It is understood that the examples are non-limiting and are capable of variation and modification. The invention is not limited to the precise details set forth in the examples.

DETAILED DESCRIPTION OF THE DRAWINGS

Figure 2:
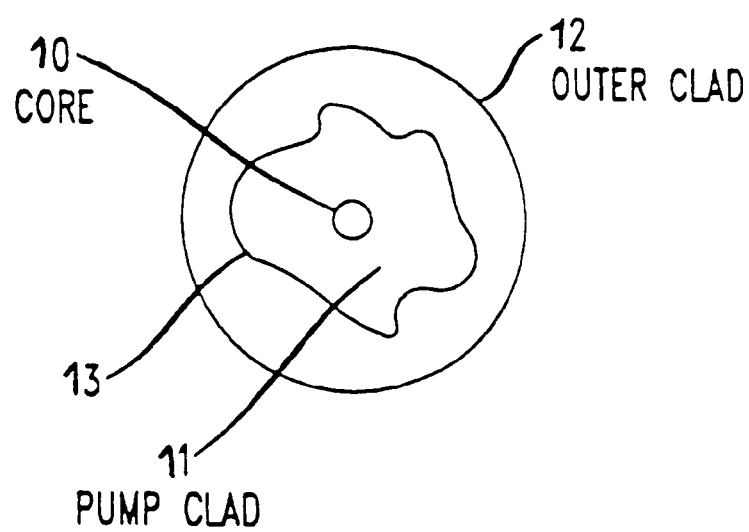
FIG. 2 is a cross-sectional view of a coated fiber structure.

A coated fiber according to the present invention can comprise a double-clad structure such as shown in FIG. 2 which consists of a core 10 and a first cladding 11 both generally of a silica-based glass and a polymeric coating or cladding 12 forming an interface 13 with the first cladding which is usually an inorganic glass structure. The polymeric coating can comprise the cured compositions of the instant invention.

EXAMPLE 1

A diacrylated perfluoroether oligomer having MW≈2000 which is commercially available as L-9367 (starting viscosity 35 cP) was reacted with 2.91% (wt.) of the tetrafunctional crosslinker tetrakis (dimethylsiloxy) silane (MW=328) using a platinum divinyl complex catalyst (PCO72, United Chemical Technologies, Inc., Bristol, Pa.). The resulting product had a viscosity of approximately 1000 cP.

Figure 1:
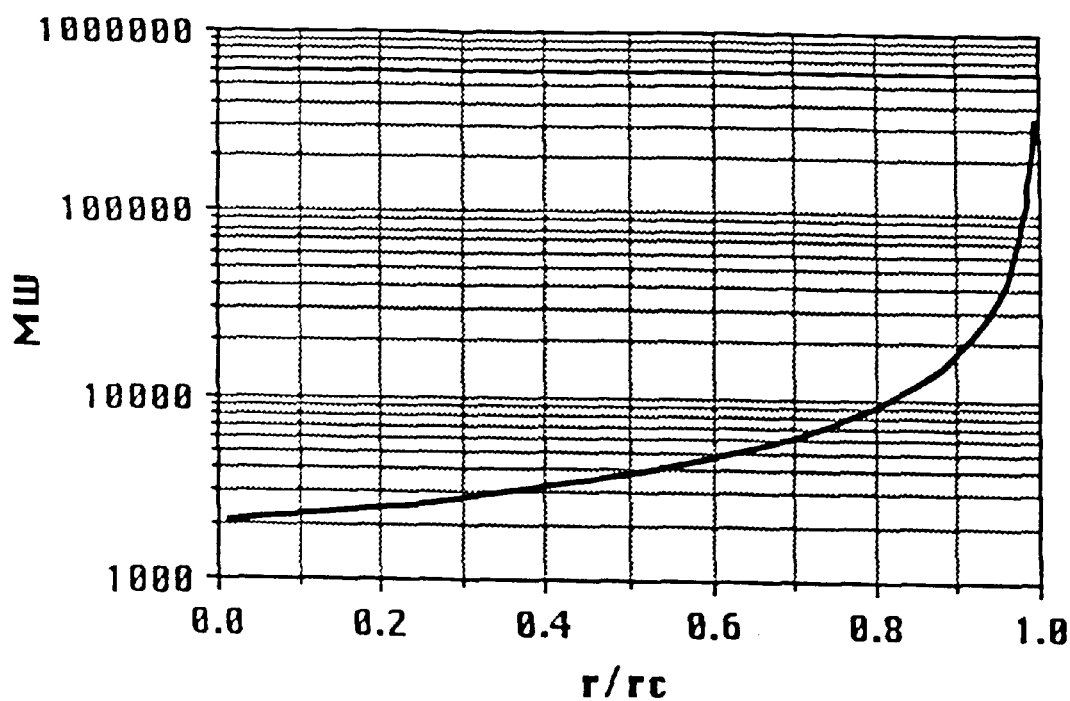
FIG. 1 shows the weight average molecular weight as a function of amount of crosslinker for a difunctional molecule (MW=2000) reacting with a tetrafunctional crosslinker (MW=328). r is the molar ratio of crosslinker to difunctional molecule and rc is the critical gelation ratio (=1/6 in this particular case).

The viscosity of the diacrylate L-9367 changes with the quotient of r, the molar ratio of crosslinker to diacrylate and rc, the critical ratio which is found to be 1/6 in this case. This relationship with respect to weight-average molecular weight is shown in FIG. 1.

EXAMPLE 2

Compatibilizing effect of FX-189. 1.028 g of L-9367 fluorinated diacrylate was mixed with 0.03 g of Darocur-1173 photoinitiator (Ciba-Geigy). The resultant mixture was milky. The mixture turned clear upon addition of 0.14 g of the fluorinated acrylate FX-189.

EXAMPLE 3

A mixture of 99 parts L-9367 and one (1) part Darocur-1173 (by weight) was found to be milky. However, a mixture containing 98 parts L-9367, 1 part Darocur-1173 and one part FX-189 was clear.

EXAMPLE 4

A coating composition comprising the viscosity increased diacrylate of example 1 (viscosity of approximately 1000 cP), 1.05% DAROCUR 1173 and 2.75% of the fluorinated acrylate compatibilizer FX-189 was prepared. A flat film of this coating composition was UV-cured. The resulting film had a refractive index of approximately 1.326. The film was clear with no haze.

EXAMPLE 5

A diacrylated perfluoroether oligomer having MW≈2000 which is commercially available as L-9367 was reacted with 2.95% of the tetrafunctional crosslinker tetrakis (dimethylsiloxy) silane using a platinum catalyst. The resulting product had a viscosity of approximately 2000–3000 cP. Hence, the viscosity of L-9367 is increased by two orders of magnitude by reacting it with 2.95% of the tetrafunctional crosslinker. The resulting product has a viscosity appropriate for coating optical fibers.

EXAMPLE 6

A coating composition comprising the viscosity increased diacrylate of example 5 (viscosity of approximately 2000–3000 cP), 0.80% DAROCUR 1173 and 0.80% of the fluorinated acrylate compatibilizer FX-189 was prepared. A film of this coating composition was UV-cured. The resulting film had a refractive index of approximately 1.319. The film was clear with no haze.

EXAMPLE 7

100 g of L-9367 (fluorinated diacrylate) was mixed with 0.1 g of a platinum solution (platinum divinyltetramethyldisiloxane complex, 2–3% platinum in xylene available as PCO72 from United Chemical Technologies) and 2.7 g of tetramethylcyclotetrasiloxane. The mixture was reacted overnight at 70° C. The product had a viscosity of 2,500 cP. This product in turn was mixed with 1.1 g FX-189 fluorinated acrylate compatibilizer and 0.9 of DAROCUR-1173 photoinitiator. A film with this formulation was cured to a solid using UV light. The resulting solid film had a refractive index of 1.323 at 23° C. and 633 nm.

EXAMPLE 8

100 g L-9367 was mixed with 0.1 g of platinum solution and 3.7 g of tetramethyltetrasiloxane. This kind of formulation would gel after 15 minutes at 60° C. However, the reaction was stopped after 12 minutes by adding 100 g of 2-methyl-3-butyn-2-ol. The mixture was shaken, and the fluorinated material was allowed to settle. Afterwards it was separated using a separation funnel. This formulation has not gelled after several months.

EXAMPLE 9

Same as example 8, except that 3,5 dimethyl-1-hexyn-3 ol was used as an inhibitor instead of 2-methyl-3-butyn-2-ol.

EXAMPLE 10

Same as example 8, except that dimethyl maleate was used as an inhibitor instead.

EXAMPLE 11

100 g L-9367 was mixed with 0.1 g Pt catalyst solution and 3.7 g tetramethylcyclotetrasiloxane. The mixture was allowed to react at 60° C. until a viscosity of about 1,000 cP was achieved. At this point, 100 g of allyl 1,1,2,3,3,3-hexafluoropropyl ether was added. The mixture is fully miscible. After sitting for a few days at room temperature, the excess allyl molecule was removed by evaporation. The resulting formulation had a viscosity of about 1,000 cP and has not gelled after several weeks.

EXAMPLE 12

19.72 g L9367 diacrylate was mixed with 0.018 g PCO72 platinum solution. 0.592 g tetramethylcyclotetrasiloxane, and 0.14275 g trimethoxysilane. The mixture was reacted for 13 hours at 60° C., after which a viscosity of about 2,000 cP was achieved. 0.209 g FX-189 acrylate compatibilizer and 0.193 g Darocur-1173 were added to the formulation. 225 m of glass optical fiber was drawn and coated with this composition. Thus, this formulation proved to have the right viscosity and cure speed for optical fiber coating applications.

EXAMPLE 13

150 m of glass optical fiber was drawn and coated with the composition described in Example 7. The optical attenuation of this polymer-clad fiber was measured at different wavelengths. At 0.9 microns the loss was about 5 dB/km, while at 1.0 microns it was less than 4 dB/km.

The above description of the present invention is illustrative and is not to be construed as limiting the scope of the invention. Various modifications and changes may occur to those skilled in the art without departing from the spirit and scope of the invention as defined by the appended claims.

What is claimed is:

1. An apparatus comprising a fiber including a core of size and transparency for transmitting electromagnetic wave energy of a first wavelength, the core being encompassed within a contacting pump cladding for receiving and transferring pump energy to the core, the pump cladding forming an interface with an enveloping second cladding derived from a composition comprising a viscosity increased di- or multi-(meth)acrylate and a photopolymerization initiator, wherein the viscosity increased di- or multi-(meth)acrylate is obtained by stepwise or controlled crosslinking of the di- or multi-(meth)acrylate.

2. Apparatus of claim 1, in which the core is rare-earth doped, in which transferred energy pumps rare earth in the core to an excited state which upon relaxation emits output radiation of the first wavelength.

3. Apparatus of claim 1 comprising a laser.

4. Apparatus of claim 1 in which the core contains erbium or neodynium or ytterbium.

5. Apparatus of claim 1 in which the core contains erbium and ytterbium.

6. Apparatus according to claim 1, wherein both core and pump cladding are comprised of silica-rich glass.

7. Apparatus of claim 1 wherein the viscosity increased di- or multi-(meth)acrylate is obtained from a fluorosubstituted di- or multi-(meth)acrylate.

8. Apparatus of claim 7, wherein the fluorosubstituted di- or multi-(meth)acrylate contains perfluoroalkylene groupings, or perfluoroalkylene groupings in which one or more carbon atoms have been replaced by oxygen (—O—) atoms.

9. Apparatus of claim 8, wherein the stepwise or controlled crosslinking increases the viscosity by a factor of at least about four and preferably at least about 50.

10. Apparatus of claim 8, wherein the stepwise or controlled crosslinking is obtained by reaction of the di- or multi-(meth)acrylate with a compound containing functional groups capable of reacting with the carbon-carbon unsaturations of the di- or multi-(meth)acrylate.

11. Apparatus of claim 10, wherein the compound containing functional groups is multifunctional with respect to the di- or multi-functional (meth)acrylate.

12. Apparatus of claim 10, wherein the compound containing functional groups is a silane, primary or secondary amine or mercaptan-containing compound.

13. Apparatus of claim 10, wherein the compound containing functional groups is a compound which can react with the di- or multi-functional (meth)acrylate by Michael addition reaction.

14. Apparatus of claim 1, further comprising a fluorinated acrylate compatibilizer.

15. Apparatus of claim 1, wherein an alkoxysilane group is covalently bonded to at least some of the multi-functional (meth) acrylate molecules.

16. Apparatus of claim 15, wherein the alkoxysilane group is a trialkoxysilane group.

17. Apparatus of claim 15, wherein an alkoxysilane group is a $C_1$–$C_6$ alkoxysilane group.

* * * * *